(12) United States Patent
Diao et al.

(10) Patent No.: US 11,924,398 B2
(45) Date of Patent: Mar. 5, 2024

(54) METHOD FOR IMPLEMENTING 3D IMAGE DISPLAY AND 3D DISPLAY DEVICE

(71) Applicants: Beijing Ivisual 3D Technology Co., Ltd., Beijing (CN); VISIOTECH VENTURES PTE. LTD., Singapore (SG)

(72) Inventors: Honghao Diao, Beijing (CN); Lingxi Huang, Beijing (CN)

(73) Assignees: Beijing Ivisual 3D Technology Co., Ltd., Beijing (CN); VISIOTECH VENTURES PTE. LTD., Singapore (SG)

( * ) Notice: Subject to any disclaimer, the term of this patent is extended or adjusted under 35 U.S.C. 154(b) by 87 days.

(21) Appl. No.: 17/779,128

(22) PCT Filed: Dec. 2, 2020

(86) PCT No.: PCT/CN2020/133319
§ 371 (c)(1),
(2) Date: May 24, 2022

(87) PCT Pub. No.: WO2021/110027
PCT Pub. Date: Jun. 10, 2021

(65) Prior Publication Data
US 2022/0408074 A1    Dec. 22, 2022

(30) Foreign Application Priority Data
Dec. 5, 2019   (CN) .......................... 201911231390.2

(51) Int. Cl.
*H04N 13/302*   (2018.01)
*H04N 13/383*   (2018.01)
*H04N 13/398*   (2018.01)

(52) U.S. Cl.
CPC ......... *H04N 13/302* (2018.05); *H04N 13/383* (2018.05); *H04N 13/398* (2018.05)

(58) Field of Classification Search
CPC .. H04N 13/302; H04N 13/383; H04N 13/398; H04N 13/305
(Continued)

(56) References Cited

U.S. PATENT DOCUMENTS

2004/0263968 A1* 12/2004 Kobayashi ............. G02B 30/36
    359/462
2018/0299683 A1* 10/2018 Ohashi ................. H04N 13/398
(Continued)

FOREIGN PATENT DOCUMENTS

CN    101909219 A    12/2010
CN    104661011 A     5/2015
(Continued)

*Primary Examiner* — Frantz B Jean
(74) *Attorney, Agent, or Firm* — Samson G. Yu

(57) ABSTRACT

A method for implementing 3D image display and a 3D display device are provided. The method comprises: detecting a posture change of a 3D display device, which comprises a multi-viewpoint 3D display screen comprising multiple composite pixels and a lenticular grating covering the multiple composite pixels, each composite pixel comprises multiple composite subpixels, each composite subpixel comprises multiple subpixels, and the lenticular grating is obliquely arranged to cover multiple subpixels along a first direction of the 3D display device to define multiple first posture viewpoints and cover at least two composite pixels along a second direction of the 3D display device to define at least two second posture viewpoints; and when a posture of the 3D display device changes, adjusting a display orientation of a 3D image, so that the 3D image is kept in an initial display orientation before a posture change of the 3D display device.

22 Claims, 10 Drawing Sheets

(58) Field of Classification Search
USPC .......................................................... 348/51
See application file for complete search history.

(56) References Cited

U.S. PATENT DOCUMENTS

2019/0373239 A1* 12/2019 Liu ...................... H04N 13/305
2021/0377515 A1* 12/2021 Aga ........................ G06T 7/579

FOREIGN PATENT DOCUMENTS

| CN | 105467603 A | 4/2016 |
| CN | 106959522 A | 7/2017 |
| CN | 211930763 U | 11/2020 |
| JP | 2009053711 A | 3/2009 |

\* cited by examiner

METHOD FOR IMPLEMENTING 3D IMAGE DISPLAY AND 3D DISPLAY DEVICE

The present application is a National Stage Filing of the PCT International Application No. PCT/CN2020/133319 filed on Dec. 2, 2020, which claims priority to the Chinese Patent Application with an application number of 201911231390.2 and a title of "Method for Implementing 3D Image Display and 3D Display Device", filed to China National Intellectual Property Administration on Dec. 5, 2019, the disclosures of which are hereby incorporated by reference.

TECHNICAL FIELD

The present disclosure relates to the technical field of 3D display, and for example, relates to a method for implementing 3D image display and a 3D display device.

BACKGROUND

At present, 3D display devices refract pixels through gratings to achieve a 3D display effect.

In the process of implementing embodiments of the present disclosure, at least the following problems are found in the related technologies: a display device is configured to display a suitable 3D effect in one posture, but does not have the function of displaying the 3D effect in another posture.

SUMMARY

In order to provide a basic understanding of some aspects of the disclosed embodiments, a brief summary is given below. The summary is not intended to be a general comment, nor to identify key/important components or describe the scope of protection of the embodiments, but to be a preface to the following detailed description.

Embodiments of the present disclosure provide a method for implementing 3D image display, a 3D display device, a computer-readable storage medium, and a computer program product, to solve the technical problem that a 3D display device cannot display a 3D image after orientation adjustment.

In some embodiments, a method for implementing 3D image display is provided, comprising: detecting a posture change of a 3D display device, wherein the 3D display device comprises a multi-viewpoint 3D display screen, the multi-viewpoint 3D display screen comprises a plurality of composite pixels and a lenticular grating covering the plurality of composite pixels, each composite pixel of the plurality of composite pixels comprises a plurality of composite subpixels, each composite subpixel of the plurality of composite subpixels comprises a plurality of subpixels, and the lenticular grating is obliquely arranged to cover a plurality of subpixels along a first direction of the 3D display device to define a plurality of first posture viewpoints and cover at least two composite pixels along a second direction of the 3D display device to define at least two second posture viewpoints; and adjusting a display orientation of a displayed 3D image when detecting that a posture of the 3D display device changes, so that the 3D image is kept in an initial display orientation before a posture change of the 3D display device.

In some embodiments, detecting a posture change of a 3D display device comprises: detecting a rotational angular velocity of the 3D display device, and determining a posture change of the 3D display device according to the rotational angular velocity; and adjusting a display orientation of a 3D image comprises: rotating a display orientation of the 3D image in a plane in which the 3D image is located, so that the 3D image is kept in an initial display orientation before a posture change of the 3D display device.

In some embodiments, a posture of the 3D display device comprises at least one of: a transverse screen display posture, a vertical screen display posture, and an oblique screen display posture.

In some embodiments, a first posture of the 3D display device before a posture change comprises: any one of a transverse screen display posture, a vertical screen display posture, and an oblique screen display posture; a second posture of the 3D display device after a posture change comprises: any one, different from the first posture, of a transverse screen display posture, a vertical screen display posture, and an oblique screen display posture; and adjusting a display orientation of a 3D image comprises: rotating the 3D image so that the 3D image is kept in an initial display orientation corresponding to the first posture.

In some embodiments, when any one of the first posture and the second posture is the oblique screen display posture, adjusting a display orientation of a 3D image further comprises: displaying the 3D image in a full screen display mode.

In some embodiments, adjusting a display orientation of a 3D image comprises: rotating a display orientation of the 3D image in a plane in which the 3D image is located, so that the 3D image is kept within an initial display orientation range, wherein the initial display orientation range comprises the initial display orientation.

In some embodiments, the method for implementing 3D image display further comprises: adjusting a display orientation of the 3D image according to a viewing orientation of a user, so that a display orientation of the 3D image coincides with a viewing orientation of the user.

In some embodiments, the viewing orientation of the user comprises: any one of a transverse viewing orientation, a vertical viewing orientation, and an oblique viewing orientation; and the method for implementing 3D image display further comprises: performing eye positioning for the user, and determining a viewing orientation of the user according to obtained eye positioning data.

In some embodiments, adjusting a display orientation of a 3D image comprises: rendering subpixels in a multi-viewpoint 3D display screen of the 3D display device based on an adjusted display orientation of the 3D image.

In some embodiments, a plurality of subpixels of each composite subpixel are arranged in row in the first direction of the 3D display device.

In some embodiments, a plurality of composite subpixels of each composite pixel are arranged in parallel in the second direction of the 3D display device.

In some embodiments, a tilt angle $\theta$ of the lenticular grating relative to the second direction of the 3D display device is arranged in such a way that the following condition is satisfied: $\pm 1/i \leq \tan \theta \leq \pm 1/2$.

In some embodiments, a tilt angle $\theta$ of the lenticular grating relative to the second direction of the 3D display device is arranged in such a way that the following condition is satisfied: $\tan \theta = 1/j$, wherein $2 \leq j \leq i$, and j is an integer.

In some embodiments, a 3D display device is provided, comprising: a processor; and a memory, storing program instructions, wherein the processor is configured to execute the above method when the program instructions are executed.

In some embodiments, a 3D display device is provided, comprising: a multi-viewpoint 3D display screen, comprising a plurality of composite pixels and a lenticular grating covering the plurality of composite pixels, wherein each composite pixel of the plurality of composite pixels comprises a plurality of composite subpixels, each composite subpixel of the plurality of composite subpixels comprises a plurality of subpixels, and the lenticular grating is obliquely arranged to cover a plurality of subpixels along a first direction of the 3D display device to define a plurality of first posture viewpoints and cover at least two composite pixels along a second direction of the 3D display device to define at least two second posture viewpoints; a posture detection apparatus, configured to detect a posture change of the 3D display device; and a 3D processing apparatus, configured to adjust a display orientation of a displayed 3D image based on a detected posture change of the 3D display device, so that the 3D image is kept in an initial display orientation before a posture change of the 3D display device.

In some embodiments, the posture detection apparatus is configured to detect a rotational angular velocity of the 3D display device, and determine a posture change of the 3D display device according to the rotational angular velocity; and the 3D processing apparatus is configured to rotate the display orientation of a 3D image in a plane in which the 3D image is located, so that the 3D image is kept in an initial display orientation before a posture change of the 3D display device.

In some embodiments, a posture of the 3D display device comprises at least one of: a transverse screen display posture, a vertical screen display posture, and an oblique screen display posture.

In some embodiments, a first posture of the 3D display device before a posture change comprises: any one of a transverse screen display posture, a vertical screen display posture, and an oblique screen display posture; a second posture of the 3D display device after a posture change comprises: any one, different from the first posture, of a transverse screen display posture, a vertical screen display posture, and an oblique screen display posture; and the 3D processing apparatus is configured to rotate the 3D image so that the 3D image is kept in an initial display orientation corresponding to the first posture.

In some embodiments, the 3D processing apparatus is configured to display the 3D image in a full screen display mode when any one of the first posture and the second posture is the oblique screen display posture.

In some embodiments, the 3D processing apparatus is configured to rotate the display orientation of a 3D image in a plane in which the 3D image is located, so that the 3D image is kept within an initial display orientation range, wherein the initial display orientation range comprises the initial display orientation.

In some embodiments, the 3D processing apparatus is configured to adjust the display orientation of the 3D image according to a viewing orientation of a user, so that the display orientation of the 3D image coincides with the viewing orientation of the user.

In some embodiments, the viewing orientation of the user comprises: any one of a transverse viewing orientation, a vertical viewing orientation, and an oblique viewing orientation; the 3D display device further comprises an eye positioning data acquisition apparatus configured to acquire eye positioning data; and the 3D processing apparatus is configured to determine the viewing orientation of the user according to obtained eye positioning data.

In some embodiments, the 3D processing apparatus is configured to render composite pixels in a multi-viewpoint 3D display screen of the 3D display device based on an adjusted display orientation of the 3D image.

In some embodiments, a plurality of subpixels of each composite subpixel are arranged in row in the first direction of the 3D display device.

In some embodiments, a plurality of composite subpixels of each composite pixel are arranged in parallel in the second direction of the 3D display device.

In some embodiments, a tilt angle θ of the lenticular grating relative to the second direction of the 3D display device satisfies the following condition: $\pm 1/i \leq \tan \theta \leq \pm \frac{1}{2}$.

In some embodiments, a tilt angle θ of the lenticular grating relative to the second direction of the 3D display device satisfies the following condition: $\tan \theta = 1/j$, wherein $2 \leq j \leq i$, and j is an integer.

The computer-readable storage medium provided by the embodiments of the present disclosure stores computer-executable instructions, and the computer-executable instructions are configured to execute the method for implementing 3D image display.

The computer program product provided by the embodiments of the present disclosure comprises a computer program stored on the computer-readable storage medium; the computer program comprises program instructions; and when the program instructions are executed by a computer, the computer executes the above method for implementing 3D image display.

The method for implementing 3D image display, the 3D display device, the computer-readable storage medium, and the computer program product, provided by the embodiments of the present disclosure may achieve the following technical effects:

The 3D display device can display suitable 3D effects in different postures, and cannot be affected by the posture adjustment of the 3D display device.

The above general description and the following description are exemplary and explanatory only, and are not intended to limit the present disclosure.

DESCRIPTION OF DRAWINGS

One or more embodiments are illustrated by the corresponding drawings, and the illustrations and drawings do not limit the embodiments. Elements having the same reference numerals in the drawings are shown as similar elements, and the drawings are not intended to limit the scale, wherein.

REFERENCE NUMERALS

Figure 1A:
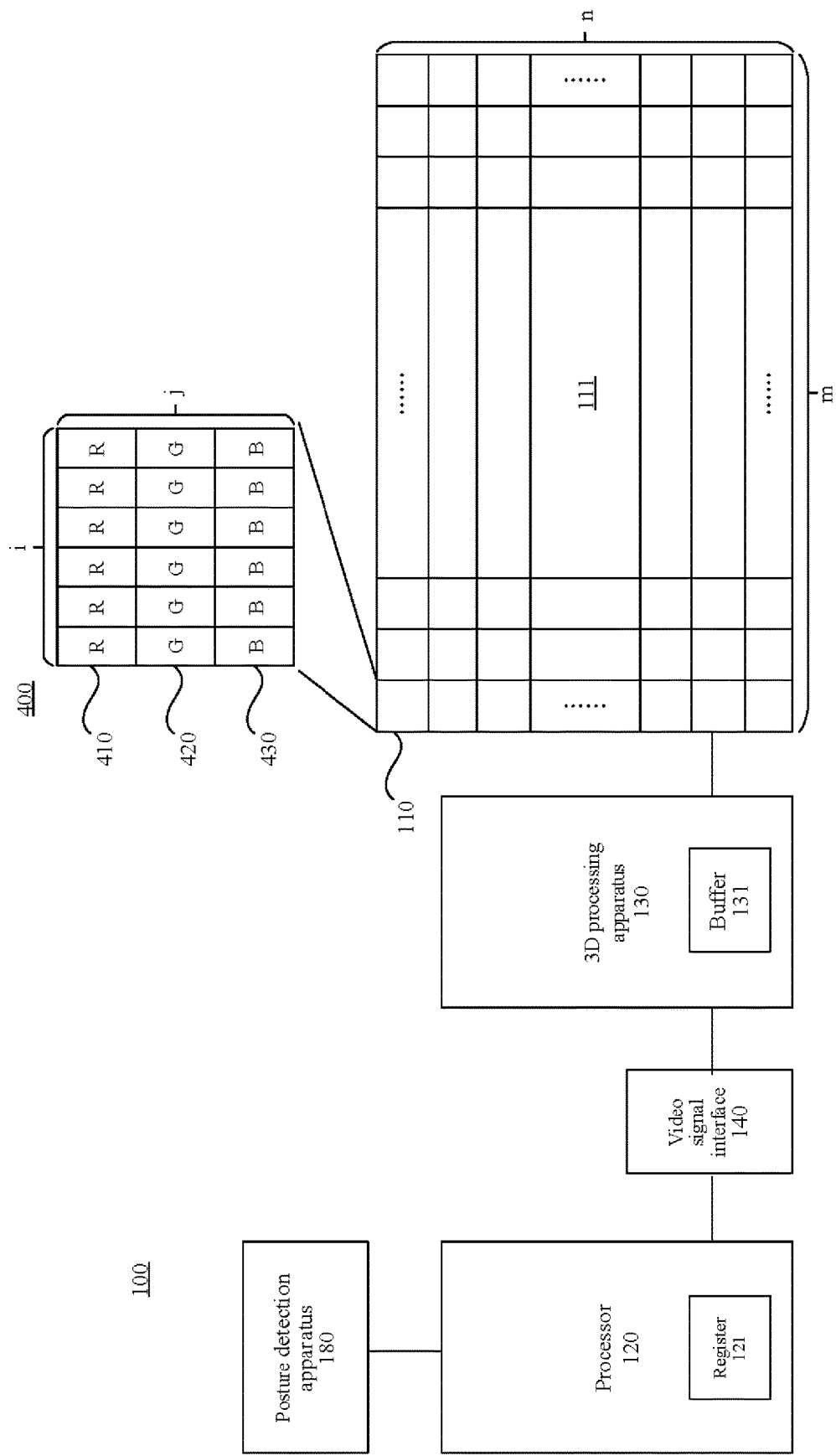
FIGS. 1A to 1C are structural schematic diagrams of a 3D display device according to embodiments of the present disclosure.

100: 3D display device; 110: multi-viewpoint 3D display screen; 120: processor; 121: register; 130: 3D processing apparatus; 131: buffer; 140: video signal interface; 150: eye positioning apparatus; 160: eye positioning data interface; 171: first posture playing region; 172: second posture playing region; 180: posture detection apparatus; 190: lenticular grating; 200: 3D display device; 201: processor; 202: multi-viewpoint 3D display screen; 203: 3D processing apparatus; 204: video signal interface; 205: eye positioning apparatus; 206: shooting apparatus; 207: indicator; 208: motor; 209: button; 210: memory; 211: subscriber identity module (SIM) card interface; 212: external memory interface; 213: universal serial bus (USB) interface; 214: charging management module; 215: power management module; 216: battery; 217: register; 218: GPU; 219: codec; 220: sensor module; 221: proximity light sensor; 222: ambient light sensor; 223: pressure sensor; 224: air pressure sensor; 225: magnetic sensor; 226: gravity sensor; 227: gyro sensor; 228: acceleration sensor; 229: distance sensor; 230: temperature sensor; 231: fingerprint sensor; 232: touch sensor; 233: bone conduction sensor; 234: audio module; 235: loudspeaker; 236: telephone receiver; 237: microphone; 238: earphone interface; 239: antenna; 240: mobile communication module; 241: antenna; 242: wireless communication module; 300: 3D display device; 310: memory; 320: processor; 330: bus; 340: communication interface; 400: composite pixel; 410: red composite subpixel; 420: green composite subpixel; 430: blue composite subpixel; 510: application program layer; 520: framework layer; 530: core class library and runtime; 540: kernel layer; 601: one of two images contained in video frames of a 3D video signal; and 602: one of two images contained in video frames of a 3D video signal.

DETAILED DESCRIPTION

For more detailed understanding of characteristics and technical contents of embodiments of the present disclosure, the implementation of the embodiments of the present disclosure will be described in detail below with reference to the accompanying drawings, and the accompanying drawings are used for reference only, instead of limiting the embodiments of the present disclosure.

Embodiments of the present disclosure provide a 3D display device, comprising a multi-viewpoint 3D display screen (such as: a multi-viewpoint naked-eye 3D display screen), a posture detection apparatus, a 3D signal interface, and a 3D processing apparatus. The multi-viewpoint 3D display screen comprises a plurality of composite pixels and a lenticular grating covering the composite pixels, wherein each composite pixel comprises a plurality of composite subpixels, and each composite subpixel includes i subpixels. In some embodiments, the multi-viewpoint 3D display screen is provided with a display panel; a plurality of composite subpixels are formed in the display panel; and the lenticular grating covers the display panel. In some embodiments, i≥3.

In some embodiments, the 3D processing apparatus is in communication connection with the multi-viewpoint 3D display screen. In some embodiments, the 3D processing apparatus is in communication connection with a driving apparatus of the multi-viewpoint 3D display screen.

In some embodiments, each composite subpixel comprises i homochromatic subpixels arranged in row in a first direction (such as length direction or transverse direction) of the 3D display device. In some embodiments, i homochromatic subpixels arranged in row may be arranged in a single row, two rows or multiple rows more than two rows.

The lenticular grating is obliquely arranged on a panel, so that the lenticular grating covers i subpixels in the first direction (e.g., the length direction or transverse direction) of the 3D display device to define i first posture viewpoints, and covers at least two composite pixels in a second direction (e.g., a width direction or vertical direction) of the 3D display device to define at least two second posture viewpoints. In some embodiments, the i subpixels covered by the lenticular grating along the first direction of the 3D display device are i subpixels belonging to the same composite subpixel. In some embodiments, the i subpixels covered by the lenticular grating along the first direction of the 3D display device belong to different composite subpixels. For example, in the case of i=6, the lenticular grating covers two adjacent composite subpixels along the first direction of the 3D display device, wherein four subpixels of one composite subpixel and two subpixels of the other composite subpixel are covered. In some embodiments, the i subpixels covered by the lenticular grating along the first direction of the 3D display device may not belong to the same composite pixel.

In some embodiments, the multi-viewpoint 3D display screen may define a first posture playing region of the 3D display device in a first posture and a second posture playing region of the 3D display device in a second posture. The posture detection apparatus is configured to detect a posture of the 3D display device. The 3D signal interface is configured to receive 3D signals. The 3D processing apparatus is configured to process the 3D signals to play 3D images from the 3D signals in the first posture playing region and play the 3D images from the 3D signals in the second posture playing region. In some embodiments, the posture of the 3D display device comprises at least one of: a transverse screen display posture, a vertical screen display posture, and an oblique screen display posture. In some embodiments, the first posture of the 3D display device before the posture change comprises: any one of the transverse screen display posture, the vertical screen display posture, and the oblique screen display posture; and the second posture of the 3D display device after the posture change comprises: any one, different from the first posture, of the transverse screen display posture, the vertical screen display posture, and the oblique screen display posture.

FIG. 1A shows a 3D display device 100 according to embodiments of the present disclosure. As shown in FIG. 1A, the 3D display device 100 comprises a multi-viewpoint 3D display screen 110, a 3D processing apparatus 130, a 3D signal interface (e.g., a video signal interface 140) for receiving video frames of 3D signals such as 3D video signals, a processor 120, and a posture detection apparatus 180. In some embodiments, the 3D signals may be static images. The 3D display device 100 may define a first direction, such as the length direction or transverse direction, and a second direction, such as the width direction or vertical direction.

The multi-viewpoint 3D display screen 110 may comprise a display panel 111 and a lenticular grating (not shown)

covering the display panel 111; and the display panel 111 may be provided with m columns and n rows (m×n) of composite pixels 400 and thus defines a display resolution of m×n.

FIG. 1A schematically shows a composite pixel 400 of the m×n composite pixels 400, comprising red composite subpixels 410 composed of i=6 red subpixels R, green composite subpixels 420 composed of i=6 green subpixels G, and blue composite subpixels 430 composed of i=6 blue subpixels B. In other embodiments, conceivably, i may be other values greater than or less than 6.

In some embodiments, each composite pixel is square. All composite subpixels of each composite pixel are arranged in parallel with each other.

In embodiments of the present disclosure, each composite subpixel has corresponding subpixels corresponding to viewpoints. The plurality of subpixels of each composite subpixel are arranged in row in a transverse direction of the multi-viewpoint 3D display screen; and colors of the plurality of subpixels in row are the same. Because the multiple viewpoints of the 3D display device are roughly arranged along the transverse direction of the multi-viewpoint 3D display screen, when the user moves to make eyes be in different viewpoints, different subpixels, corresponding to the corresponding viewpoints, in each composite subpixel need to be rendered dynamically. Because the homochromatic subpixels in each composite subpixel are arranged in row, a cross-color problem caused by persistence of vision can be avoided. In addition, due to refraction of the gratings, a part of currently displayed subpixels may be seen at an adjacent viewpoint; but through arrangement of subpixels with the same color in the same row, a problem of color mixing is absent even if a part of the currently displayed subpixels are seen.

Figure 2A:
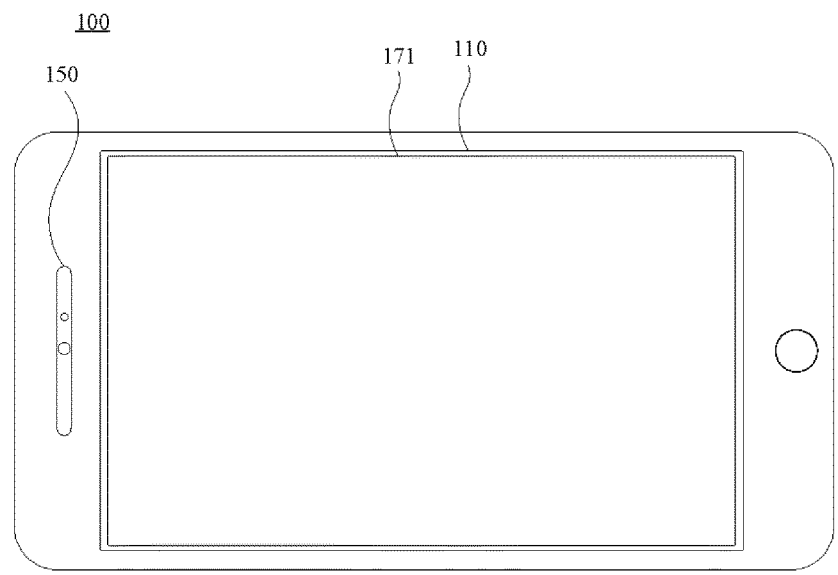
FIGS. 2A and 2B show two postures of a 3D display device and corresponding playing regions according to embodiments of the present disclosure.
Figure 2B:
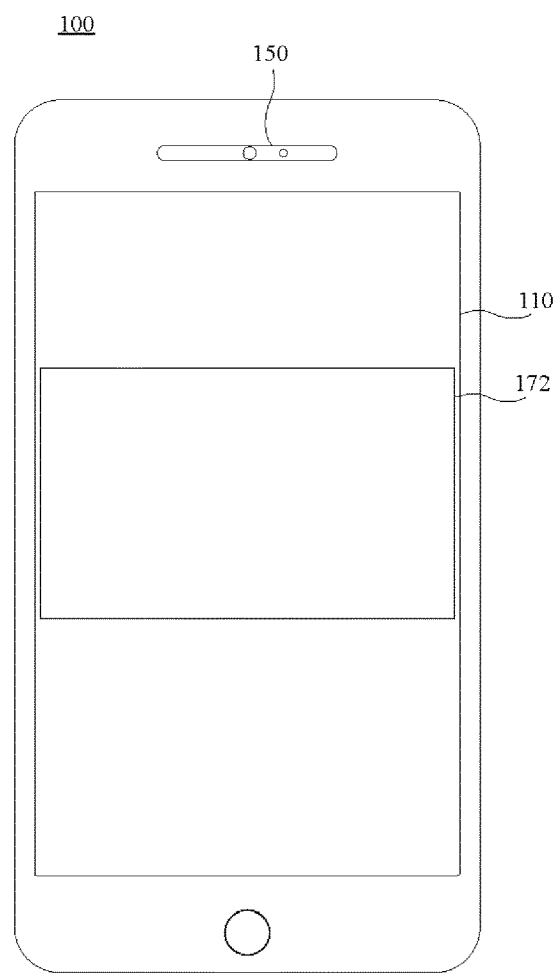

As described above, the 3D display device may have multiple different postures. Referring to FIG. 2A, the 3D display device 100 has a first posture such as a transverse screen display posture, and the multi-viewpoint 3D display screen 110 may define a first posture playing region 171 adapted to the first posture. Referring to FIG. 2B, the 3D display device 100 may further have a second posture such as a vertical screen display posture, and the multi-viewpoint 3D display screen 110 may define a second posture playing region 172 adapted to the second posture.

In some embodiments, the first posture playing region 171 and the second posture playing region 172 may have different dimensions. The area of the first posture playing region 171, for example, may account for 80% to 100% of the area of the multi-viewpoint 3D display screen 110. The area of the second posture playing region 172, for example, may account for 30% to 60% of the area of the multi-viewpoint 3D display screen 110. When the 3D display device 100 is in the second posture, the second posture playing region 172, for example, may be located in the middle of the multi-viewpoint 3D display screen 110. In some embodiments, the first posture playing region 171 and the second posture playing region 172 may have different display resolutions.

In some embodiments, the lenticular grating is obliquely arranged on the display panel and cooperate with the composite pixels or the subpixels in the composite subpixels of the composite pixels in different postures of the 3D display device to form 3D effects, respectively. A plurality of lenticular gratings may be arranged side by side in parallel with each other on a surface of the display panel.

In some embodiments, a tilt angle θ of the lenticular grating relative to the second direction of the 3D display device satisfies the following condition: $\pm 1/i \leq \tan \theta \leq \pm \frac{1}{2}$.

In some embodiments, $\tan \theta = 1/j$, wherein $2 \leq j \leq i$, and j is an integer.

Figure 3A:
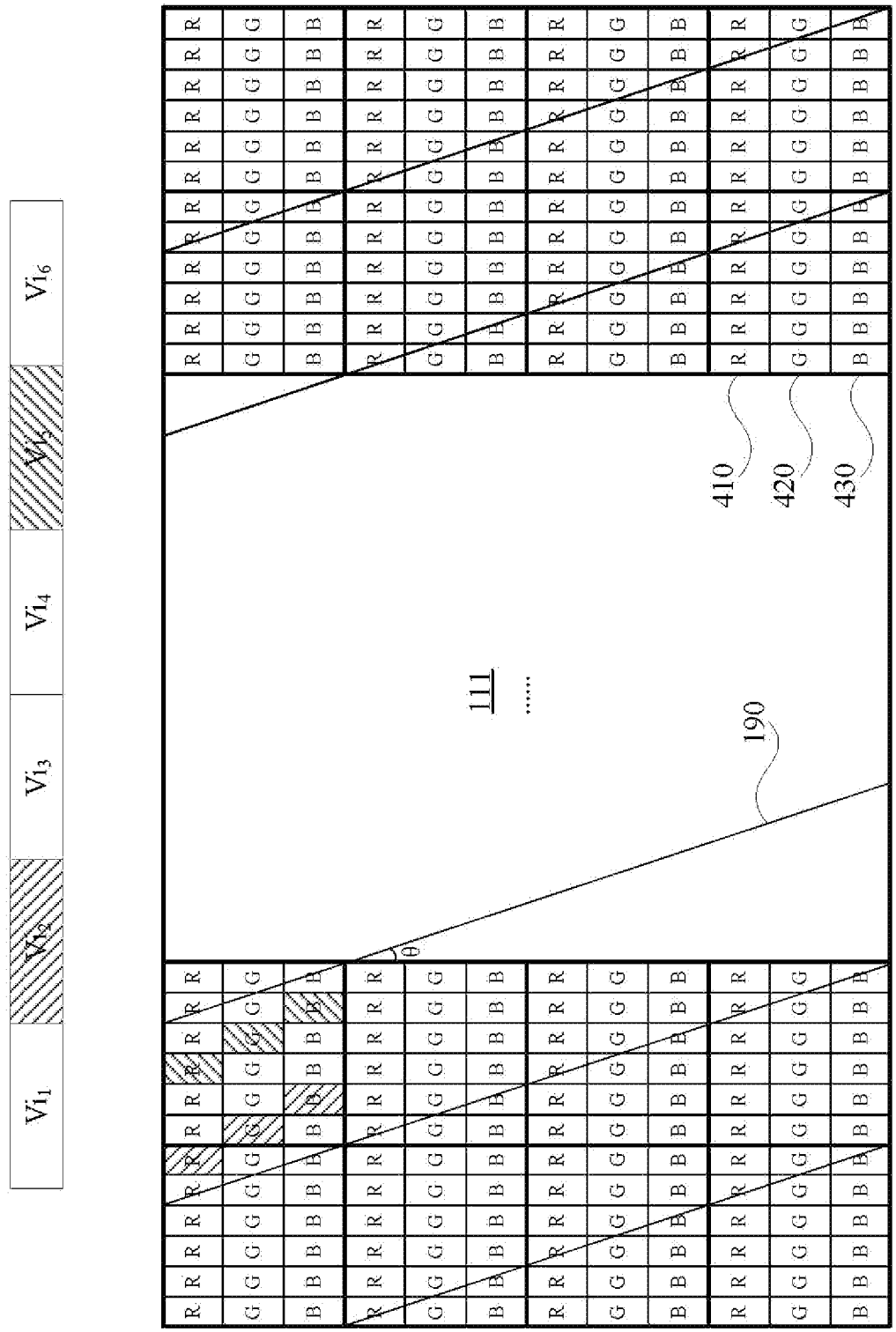
FIGS. 3A and 3B show dynamic rendering of a 3D display device in two postures according to embodiments of the present disclosure.
Figure 3B:
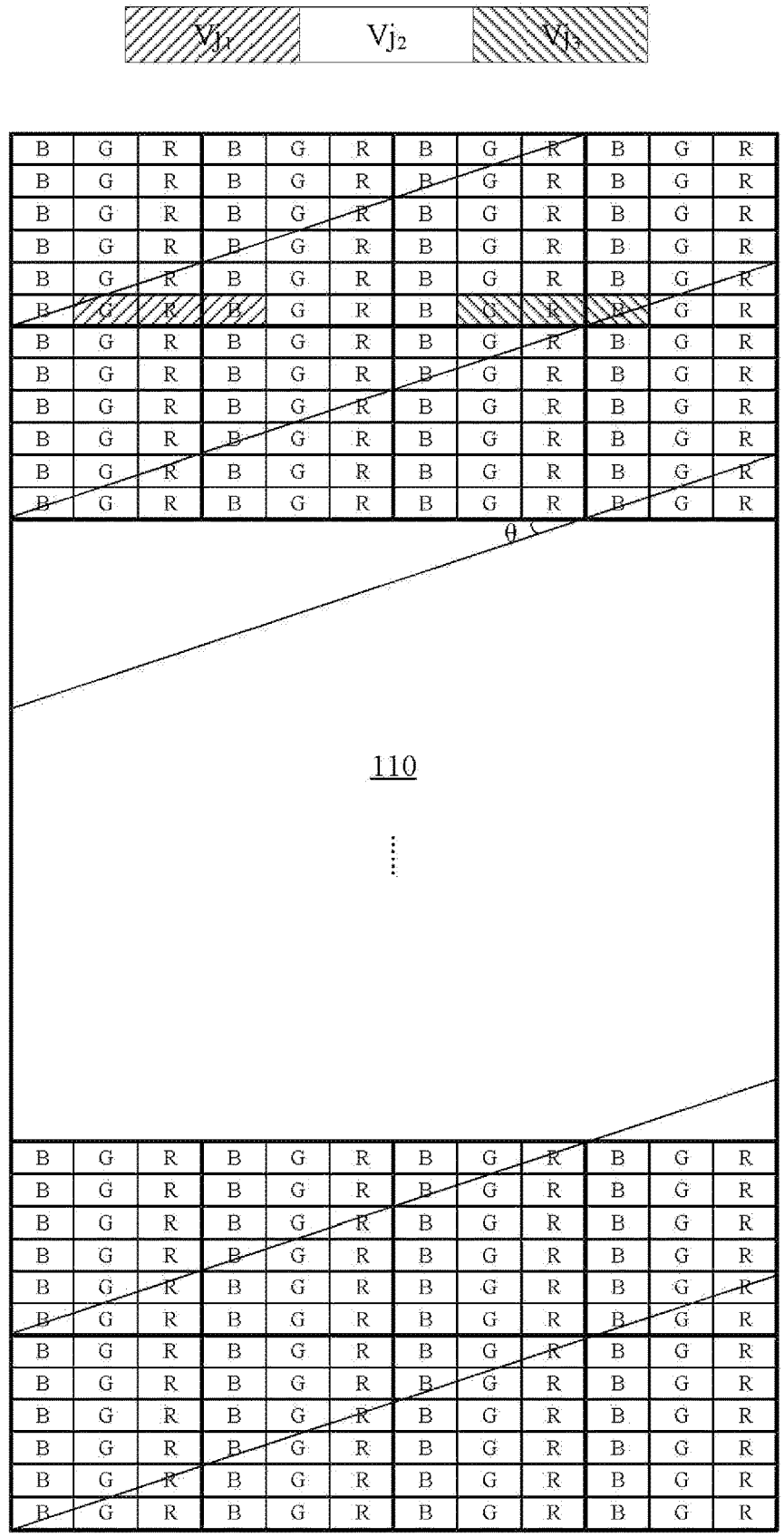

Referring to FIGS. 3A and 3B, an exemplary arrangement of the lenticular grating is shown. In the illustrated embodiments, each composite pixel is square and contains three composite subpixels, i.e., a red composite subpixel, a green composite subpixel and a blue composite subpixel, arranged in parallel along the second direction of the 3D display device. Each composite subpixel contains i=6 homochromatic subpixels; and i=6 homochromatic subpixels of each composite subpixel are arranged side by side in the first direction of the 3D display device. The lenticular grating 190 is arranged on the display panel 111 at a tilt angle θ with respect to the second direction of the 3D display device; and $\tan \theta = \frac{1}{3}$. As shown in the figures, the lenticular grating 190 covers i=6 subpixels along the first direction of the 3D display device, and defines i=6 first posture viewpoints Vi1-Vi6 (as shown in FIG. 3A) in the first posture of the 3D display device; and the lenticular grating 190 covers three composite pixels along the second direction of the 3D display device, and defines three second posture viewpoints Vj1-Vj3 (as shown in FIG. 3B) in the second posture of the 3D display device.

Conceivably, in other embodiments, the lenticular grating covers i subpixels along the first direction of the 3D display device, and cover other number of composite pixels along the second direction of the 3D display device. In some embodiments, i≥3.

In some embodiments, the tilt angle θ of the lenticular grating relative to the second direction of the 3D display device satisfies: $\tan \theta = \frac{1}{2}$. The lenticular grating covers i subpixels along the first direction of the 3D display device, i=6, thereby defining six first posture viewpoints of the 3D display device in the first posture, and cover two composite pixels along the second direction of the 3D display device, thereby defining two second posture viewpoints of the 3D display device in the second posture.

In some embodiments, the tilt angle θ of the lenticular grating relative to the second direction of the 3D display device satisfies: $\tan \theta = \frac{1}{4}$. The lenticular grating covers i subpixels along the first direction of the 3D display device, i=6, thereby defining six first posture viewpoints of the 3D display device in the first posture, and cover four composite pixels along the second direction of the 3D display device, thereby defining four second posture viewpoints of the 3D display device in the second posture.

In some embodiments, the tilt angle θ of the lenticular grating relative to the second direction of the 3D display device satisfies: $\tan \theta = \frac{1}{5}$. The lenticular grating covers i subpixels along the first direction of the 3D display device, i=6, thereby defining six first posture viewpoints of the 3D display device in the first posture, and cover five composite pixels along the second direction of the 3D display device, thereby defining five second posture viewpoints of the 3D display device in the second posture.

In some embodiments, the tilt angle θ of the lenticular grating relative to the second direction of the 3D display device satisfies: $\tan \theta = \frac{1}{6}$. The lenticular grating covers i subpixels along the first direction of the 3D display device, i=6, thereby defining six first posture viewpoints of the 3D display device in the first posture, and cover six composite pixels along the second direction of the 3D display device, thereby defining six second posture viewpoints of the 3D display device in the second posture.

In an embodiment as shown FIG. 1A, the 3D processing apparatus 130 may optionally comprise a buffer 131, to buffer the received video frames.

The 3D display device 100 may further comprise a processor 120 in communication connection to the 3D processing apparatus 130 through a video signal interface 140. In some embodiments, the processor 120 is contained in a computer or an intelligent terminal such as a mobile terminal, or serves as a processor apparatus.

In some embodiments, the video signal interface 140 is an internal interface for connecting the processor 120 with the 3D processing apparatus 130. Such a 3D display device 100, for example, may be a mobile terminal; and the video signal interface 140 may be a mobile industry processor interface (MIPI), a mini-MIPI, a low voltage differential signaling (LVDS) interface, a min-LVDS interface or a Display Port interface.

In some embodiments, as shown in FIG. 1A, the processor 120 of the 3D display device 100 may further comprise a register 121. The register 121 may be configured to temporarily store instructions, data and addresses.

The posture detection apparatus 180 may be in communication connection with the processor 120. The posture detection apparatus 180 may be a gravity sensor or a gyro sensor.

Figure 1B:
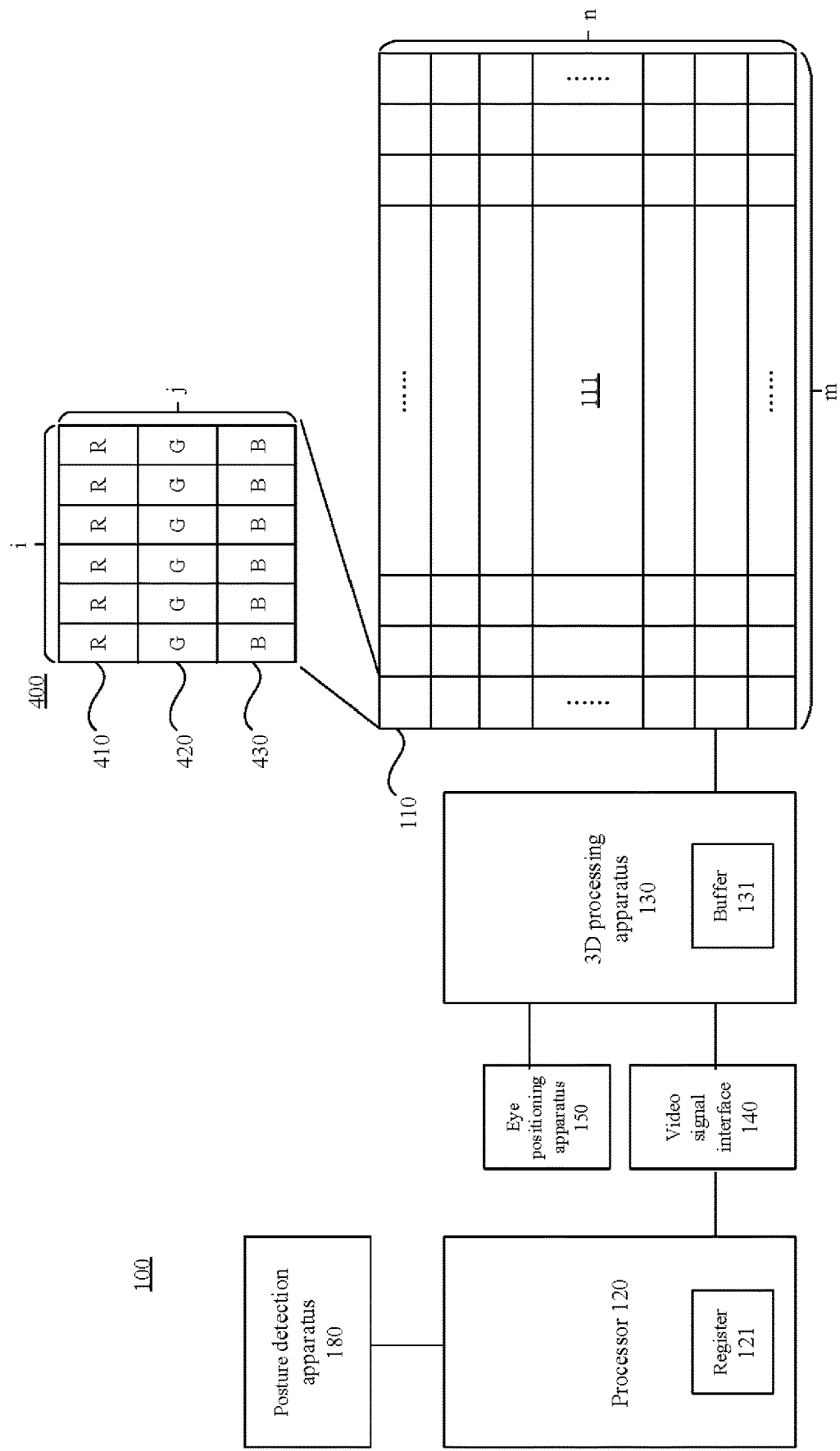
Figure 1C:
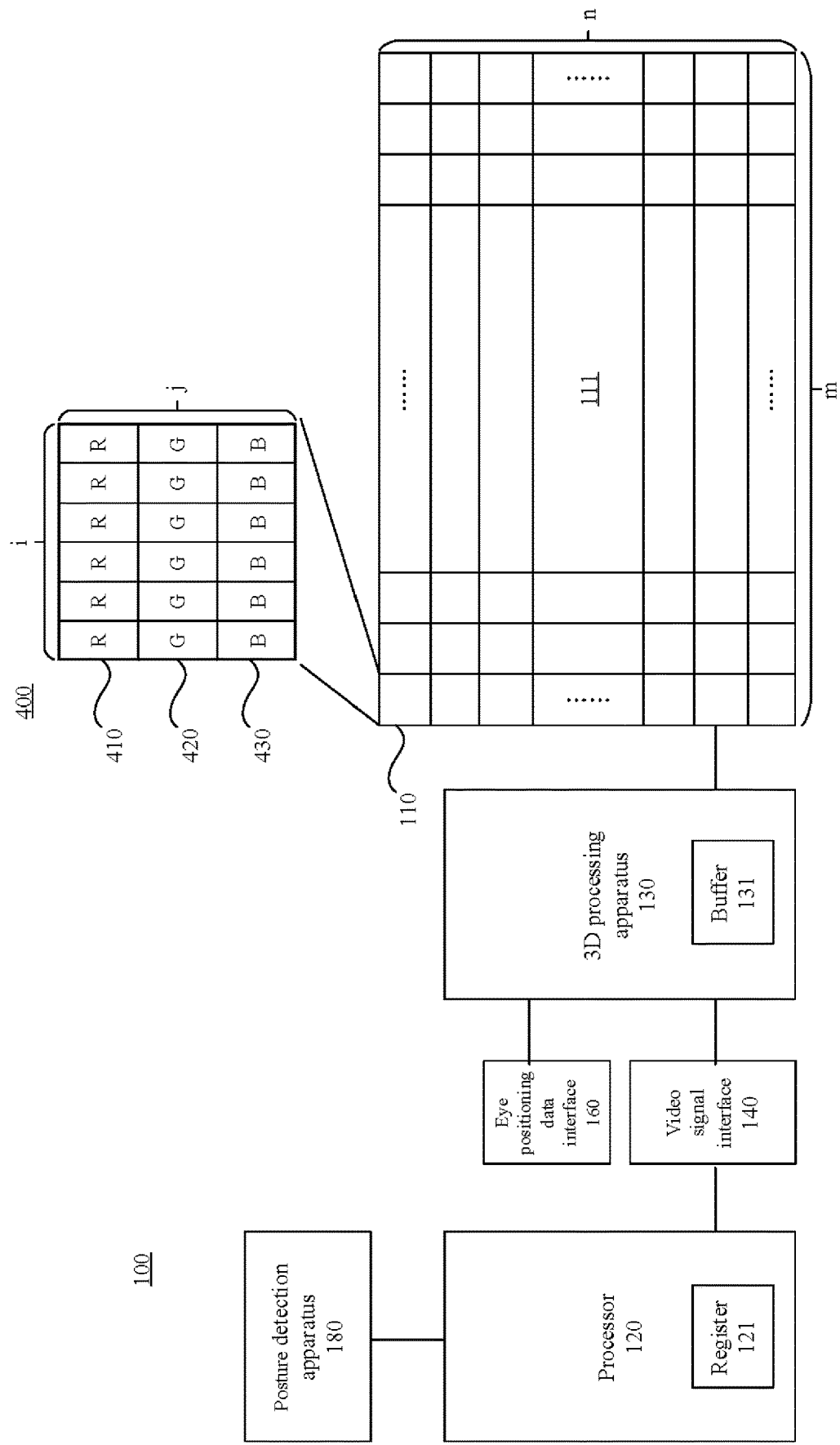

In some embodiments, the 3D display device further comprises an eye positioning data acquisition apparatus configured to acquire eye positioning data, such as an eye positioning apparatus or an eye positioning data interface. For example, in an embodiment shown in FIG. 1B, the 3D display device 100 comprises an eye positioning apparatus 150 in communication connection to the 3D processing apparatus 130, so that the 3D processing apparatus 130 may directly receive eye positioning data. In an embodiment shown in FIG. 1C, an eye positioning apparatus (not shown), for example, may be directly connected to the processor 120; and the 3D processing apparatus 130 acquires eye positioning data from the processor 120 through an eye positioning data interface 160. In other embodiments, the eye positioning apparatus may be simultaneously connected with the processor and the 3D processing apparatus, so that on the one hand, the 3D processing apparatus 130 may directly acquire eye positioning data from the eye positioning apparatus, and on the other hand, other information acquired by the eye positioning apparatus may be processed by the processor.

Figure 4:
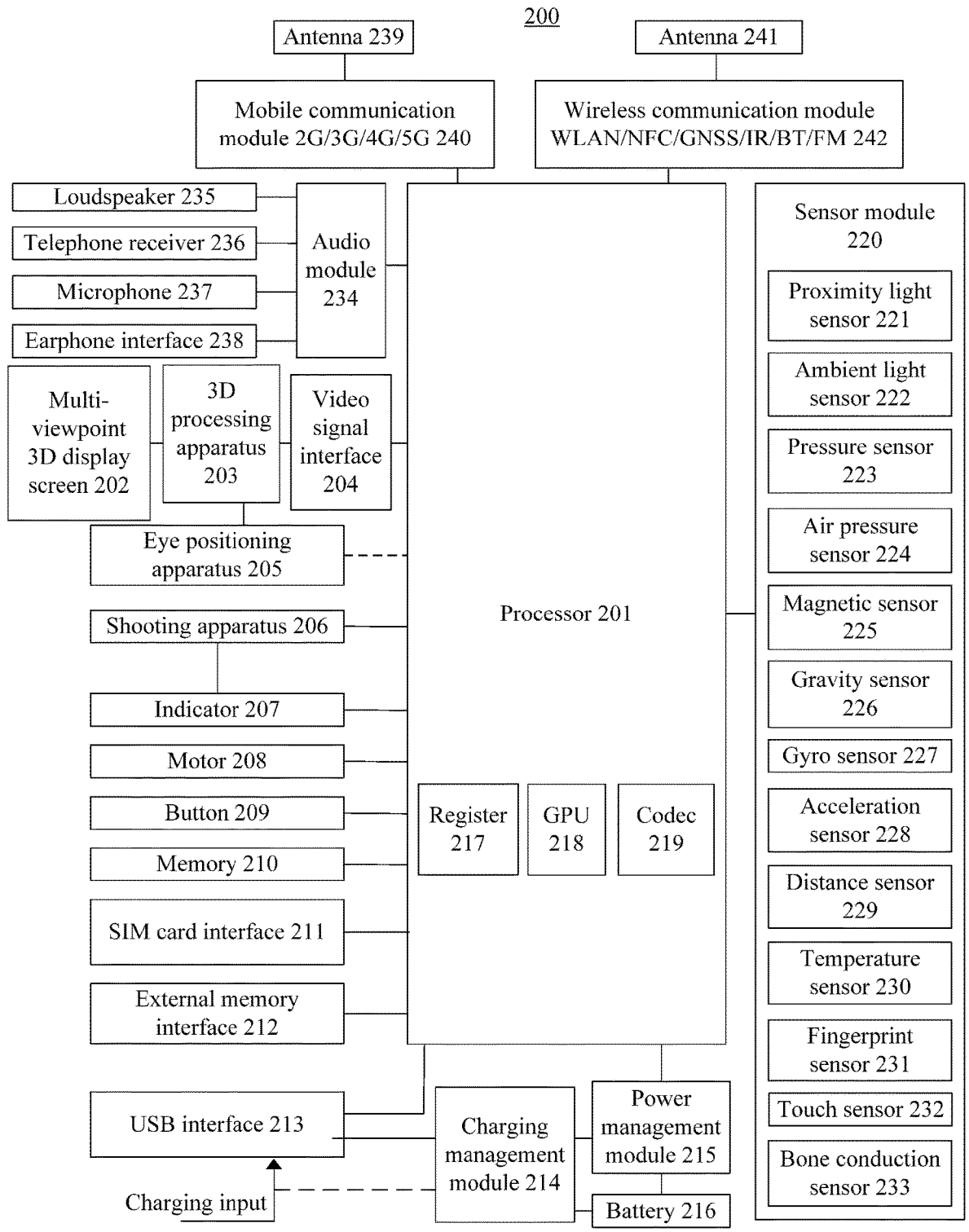
FIG. 4 is a structural schematic diagram of hardware of a 3D display device according to an embodiment of the present disclosure.

Exemplarily, FIG. 4 shows a structural schematic diagram of hardware of a 3D display device 200, for example, a mobile terminal such as a smart cell phone, or a tablet personal computer (PC). In the illustrated embodiment, the 3D display device 200 may comprise a processor 201, an external memory interface 211, an (internal) memory 210, a USB interface 213, a charging management module 214, a power management module 215, a battery 216, a mobile communication module 240, a wireless communication module 242, antennas 239 and 241, an audio module 234, a loudspeaker 235, a telephone receiver 236, a microphone 237, an earphone interface 238, a button 209, a motor 208, an indicator 207, an SIM card interface 221, a multi-viewpoint 3D display screen 202, a 3D processing apparatus 203, a 3D signal interface (such as a video signal interface 204), a shooting apparatus 206, an eye positioning apparatus 205, a sensor module 220 and the like.

In some embodiments, the sensor module 220 may comprise a proximity light sensor 221, an ambient light sensor 222, a pressure sensor 223, an air pressure sensor 224, a magnetic sensor 225, a gravity sensor 226, a gyro sensor 227, an acceleration sensor 228, a distance sensor 229, a temperature sensor 230, a fingerprint sensor 231, a touch sensor 232, and a bone conduction sensor 233.

In some embodiments, the processor 201 may comprise one or more processing units. In some embodiments, the processor 201 may comprise one or a combination of at least two of: an application processor (AP), a modem processor, a baseband processor, a graphics processing unit (GPU), an image signal processor (ISP), a controller, a memory, a video codec, a digital signal processor (DSP), a baseband processor, a neural network processor (NPU) and the like. Different processing units may be independent elements, and may also be integrated in one or more processors.

In some embodiments, the processor 201 may comprise one or more interfaces. Interfaces may comprise an integrated circuit (I2C) interface, an integrated circuit built-in audio (I2S) interface, a pulse code modulation (PCM) interface, a universal asynchronous receiver-transmitter (UART) interface, a mobile industry processor interface (MIPI), a general purpose input-output (GPIO) interface, an SIM interface, a USB interface and the like.

The USB interface 213 is an interface compliant with USB standard specifications, and may be a Mini USB interface, a Micro USB interface, a USB Type C interface or the like. The USB interface 213 may be used for connecting with the charger to charge the 3D display device 200, and may also be used for transmitting data between the 3D display device 200 and the peripheral devices. The USB interface 213 may also be used for connecting with earphones and playing audio through the earphones.

A wireless communication function of the 3D display device 200 may be implemented by the antennas 241 and 239, the mobile communication module 240, the wireless communication module 242, the modem processor, the baseband processor or the like.

In some embodiments, the antenna 239 of the 3D display device 200 is coupled with the mobile communication module 240, and the antenna 241 is coupled with the wireless communication module 242, so that the 3D display device 200 may communicate with the network and other devices through wireless communication technology.

In some embodiments, the external interface for receiving 3D video signals may comprise the USB interface 213, the mobile communication module 240, the wireless communication module 242, or any combination thereof.

The memory 210 may be used for storing computer-executable program codes comprising instructions. The processor 201 executes application of various functions and data processing of the 3D display device 200 by running the instructions stored in the memory 210.

The external memory interface 212 may be used for connecting with an external memory card, such as a Micro SD card, to expand storage capacity of the 3D display device 200. The external memory card communicates with the processor 201 through the external memory interface 212, to implement a data storage function.

In some embodiments, memories of the 3D display device may comprise the (internal) memory 210, an external memory card connected with the external memory interface 212, or a combination thereof.

In embodiments of the present disclosure, the shooting apparatus 206 may capture images or videos.

In some embodiments, the 3D display device 200 implements a display function through the video signal interface 204, the 3D processing apparatus 203, the multi-viewpoint 3D display screen 202, and the application processor.

In some embodiments, the 3D display device 200 may comprise a GPU 218, for example, be used for processing 3D video images in the processor 201, and be also used for processing 2D video images.

In some embodiments, the 3D display device 200 further comprises a video codec 219 configured to compress or decompress digital videos.

In some embodiments, the video signal interface 204 is configured to output video frames of a 3D video signal, such as a decompressed 3D video signal, processed by the GPU 218 or the codec 219 or both to the 3D processing apparatus 203.

In some embodiments, the GPU 218 or the codec 219 is integrated with a format adjuster.

In some embodiments, the multi-viewpoint 3D display screen 202 is used for displaying 3D images or videos. The multi-viewpoint 3D display screen 202 may comprise a display panel and gratings.

In some embodiments, the eye positioning apparatus 205 is in communication connection to the 3D processing apparatus 203, so that the 3D processing apparatus 203 may render the corresponding subpixels in the composite pixels (composite subpixels) based on the eye positioning data. In some embodiments, the eye positioning apparatus 205 may further be connected with the processor 201, for example, be in by-passing connection with the processor 201.

The 3D display device 200 may implement audio functions through the audio module 234, the loudspeaker 235, the telephone receiver 236, the microphone 237, the earphone interface 238, the application processor and the like.

The button 209 comprises a power button, a volume button and the like. The button 209 may be a mechanical button, and may also be a touch button. The 3D display device 200 may receive button input, and generate button signal input related to user settings and function control of the 3D display device 200.

The motor 208 may generate a vibration alert. The motor 208 may be configured to vibrate to prompt an incoming call, and may also be configured to vibrate to feed touch back.

The SIM card interface 211 is configured to connect with an SIM card. In some embodiments, the 3D display device 200 adopts an embedded SIM card (eSIM).

The pressure sensor 223 is configured to sense pressure signals, and may convert the pressure signals into electrical signals.

The air pressure sensor 224 is used for measuring air pressure.

The magnetic sensor 225 comprises a Hall sensor.

The gravity sensor 226, as a posture detection apparatus, can convert motion or gravity into electrical signals, and is configured to measure parameters, such as tilt angle, inertia force, impact and vibration.

The gyro sensor 227, as a posture detection apparatus, is configured to determine a motion posture of the 3D display device 200.

The gravity sensor 226 or the gyro sensor 227 may be adopted to detect that the 3D display device 200 is in a first posture or a second posture different from the first posture, or the 3D display device is converted between the first posture and the second posture.

The acceleration sensor 228 may detect acceleration of the 3D display device 200 in various directions (generally three axes).

The distance sensor 229 may be configured to measure a distance.

The temperature sensor 230 may be configured to detect a temperature.

The fingerprint sensor 231 may be configured to collect fingerprints.

The touch sensor 232 may be arranged in the multi-viewpoint 3D display screen 202; and the touch sensor 232 and the multi-viewpoint 3D display screen 202 form a touch screen, also called a "touch panel".

The bone conduction sensor 233 may acquire vibration signals.

The charging management module 214 is configured to receive charging input from the charger.

The power management module 215 is configured to connect the battery 216 and the charging management module 214 to the processor 201. The power management module 215 receives input from at least one of the battery 216 and the charging management module 214, and supplies power to the processor 201, the memory 210, the external memory, the multi-viewpoint 3D display screen 202, the shooting apparatus 206, the wireless communication module 242 and the like. In other embodiments, the power management module 215 and the charging management module 214 may also be arranged in the same element.

A software system of the 3D display device 200 may adopt a hierarchical architecture, an event-driven architecture, a microkernel architecture, a micro-service architecture or a cloud architecture. In embodiments shown in the present disclosure, an Android system with the hierarchical architecture is taken as an example, to illustrate a structure of software of the 3D display device 200. However, conceivably, the embodiments of the present disclosure may be implemented in different software systems, such as an operating system.

Figure 5:
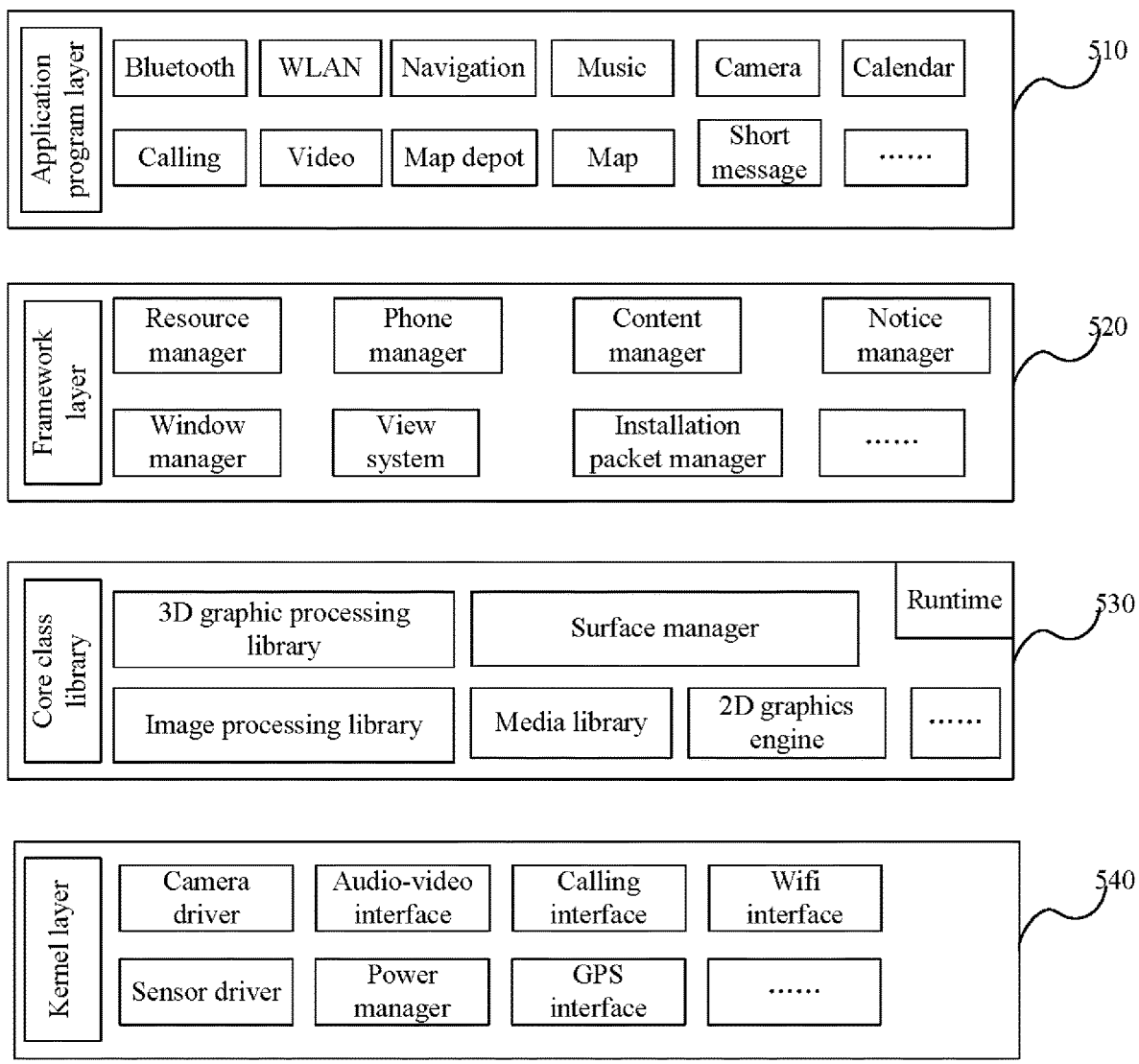
FIG. 5 is a structural schematic diagram of software of a 3D display device according to an embodiment of the present disclosure.

FIG. 5 is a structural schematic diagram of the software of the 3D display device 200 such as the mobile terminal. The hierarchical architecture divides the software into several layers. The layers communicate with each other through a software interface. In some embodiments, the Android system is divided into four layers, from top to bottom, comprising an application program layer 510, a framework layer 520, core class library and runtime 530, and a kernel layer 540.

Figure 6:
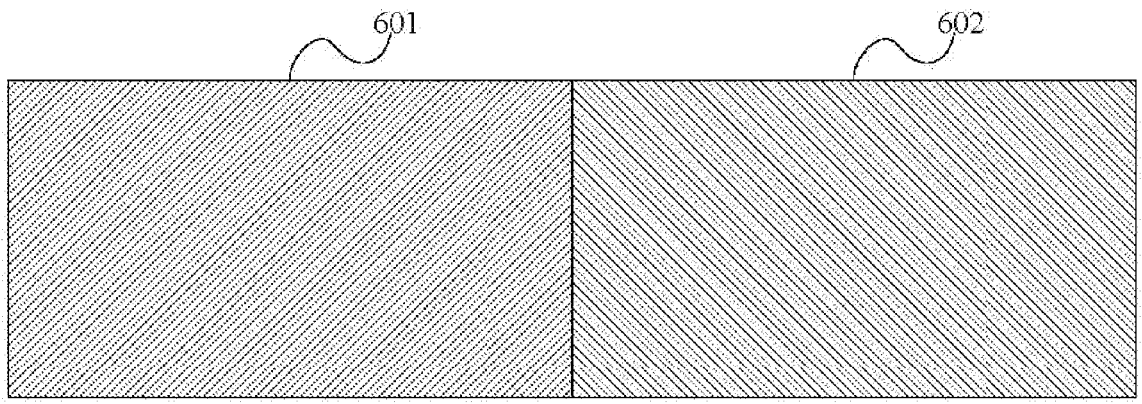
FIG. 6 is a schematic diagram of formats and contents of images contained in video frames of 3D video signals according to an embodiment of the present disclosure.

The application program layer 510 may comprise a series of application packages. As shown in FIG. 6, the application packages may comprise application programs, such as Bluetooth, WLAN, navigation, music, camera, calendar, call, video, gallery, map and short message.

The framework layer 520 provides an application programming interface (API) and a programming framework for application programs in the application program layer. As shown in FIG. 5, the framework layer 520 may comprise a resource manager, a phone manager, a content manager, a notification manager, a window manager, a view system installation package and manager and the like.

Android Runtime comprises a core library and a virtual machine. The Android Runtime is responsible for scheduling and management of an Android system. The core library comprises two parts: one is performance functions to be called by java language, and the other is the core library of Android.

The application program layer and the framework layer run in the virtual machine. The virtual machine executes java files of the application program layer and the framework layer as binary files. The virtual machine is used for implementing functions of object life cycle management, stack management, thread management, security and exception management, garbage collection and the like.

The core class library may comprise a plurality of functional modules, such as a 3D graphics processing library (such as OpenGL ES), a surface manager, an image processing library, a media library and a graphics engine (such as SGL).

The kernel layer 540 is a layer between hardware and software. The kernel layer at least comprises a camera driver, an audio and video interface, a call interface, a Wifi interface, a sensor driver, a power manager and a GPS interface.

Transmission and display of a 3D video signal in the 3D display device according to embodiments of the present disclosure are described below with reference to FIG. 6. As described above, the 3D display device defines a plurality of viewpoints corresponding to each posture. Eyes of the user may see the display of corresponding subpixels in each composite pixel or each composite subpixel in the display panel of the multi-viewpoint 3D display screen at each viewpoint (spatial position) corresponding to each posture. Two different pictures seen by both eyes of the user at different viewpoints form parallax, to composite a 3D picture in the brain.

In some embodiments of the present disclosure, the 3D processing apparatus 130 receives, for example, video frames of a decompressed 3D video signal from the processor 120 through, for example, the video signal interface 140 as the internal interface. Each video frame may contain two images, or contain composite images, or be composed of the above images.

In some embodiments, the two images or the composite images may comprise different types of images and may be in various arrangement forms.

As shown in FIG. 6, each video frame of the 3D video signal contains or is composed of two images 601 and 602 in parallel. In some embodiments, the two images may be a left-eye parallax image and a right-eye parallax image, respectively. In some embodiments, the two images may be a rendered color image and a depth of field (DOF) image, respectively.

In some embodiments, each video frame of the 3D video signal contains interlaced composite images. In some embodiments, the composite images may be interlaced left-eye and right-eye parallax composite images, and interlaced rendered color and DOF composite images.

In some embodiments, after receiving a video frame comprising two images 601 and 602, at least one 3D processing apparatus 130 renders at least one subpixel in each composite subpixel based on one of the two images and at least another subpixel in each composite subpixel based on the other of the two images.

In other embodiments, after receiving a video frame comprising composite images, at least one 3D processing apparatus renders at least two subpixels in each composite subpixel based on the composite images. For example, at least one subpixel is rendered according to a first image (part) in the composite images, and at least another subpixel is rendered according to a second image (part).

In some embodiments, the rendering for the subpixels may be dynamic rendering based on the eye positioning data. Real-time eye positioning data may be acquired through an eye positioning apparatus or an eye positioning data interface.

In some embodiments, the eye positioning apparatus of the 3D display device is configured to be in communication connection with the posture detection apparatus of the 3D display device to acquire positions of viewpoints, at which the eyes of user are, in relation to the posture of the 3D display device. The posture detection apparatus, for example, may be a gyro sensor or a gravity sensor, and may detect that the 3D display device is in the first posture, the second posture and the switching between the two postures.

In some embodiments, acquiring positions of viewpoints, at which the eyes of user are, in relation to the posture of the 3D display device comprises: acquiring positions of first posture viewpoints, at which the eyes of user are, when the 3D display device is in the first posture. In other embodiments, acquiring positions of viewpoints, at which the eyes of user are, in relation to the posture of the 3D display device comprises: acquiring positions of second posture viewpoints, at which the eyes of user are, when the 3D display device is in the second posture.

In some embodiments, the 3D processing apparatus is configured to render relevant subpixels in the first posture playing region according to the 3D images from the 3D signals, based on the first posture viewpoints at which the eyes of the user are.

Referring to FIG. 3A, an example of dynamic rendering corresponding to the first posture is shown. As shown in FIG. 3A, when the posture detection apparatus detects that the 3D display device is in the first posture or switched from the second posture to the first posture, the eye positioning apparatus detects the first posture viewpoints corresponding to both eyes of the user, for example, the left eye corresponds to a viewpoint Vi2 in the first posture viewpoints, and the right eye corresponds to Vi5 in the first posture viewpoints. Based on the video frames of the 3D video signals, images of the first posture viewpoints corresponding to both eyes of the user are generated, and subpixels, corresponding to the first posture viewpoints Vi2 and Vi5, in the composite subpixels are rendered in the first playing region 171. FIG. 3A schematically shows the rendering of part of subpixels.

In some embodiments, the 3D processing apparatus is configured to render relevant subpixels, corresponding to the second posture viewpoints, in the covered composite pixels in the second posture playing region according to the 3D images from the 3D signals, based on the second posture viewpoints at which the eyes of the user are.

Referring to FIG. 3B, an example of dynamic rendering corresponding to the second posture is shown. As shown in FIG. 3B, when the posture detection apparatus detects that the 3D display device is in the second posture or switched from the first posture to the second posture, the eye positioning apparatus detects the second posture viewpoints corresponding to both eyes of the user, for example, the left eye corresponds to a viewpoint Vj1 in the second posture viewpoints, and the right eye corresponds to Vj3 in the second posture viewpoints. Based on the video frames of the 3D video signals, images of the second posture viewpoints corresponding to both eyes of the user are generated, and subpixels, corresponding to the second posture viewpoints Vj1 and Vj3, in the three composite pixels covered by the lenticular grating 190 are rendered in the second playing region 172. FIG. 3B schematically shows the rendering of part of subpixels in the covered composite pixels.

In some embodiments, the 3D display device further comprises a format adjuster (not shown), configured to adjust the format of the 3D signals, for example, preprocess the video frames of the 3D video signals, to be suitable for playing the 3D images in the first posture playing region and the second posture playing region. For example, when the resolution of the 3D signals is inconsistent with a display resolution of the first posture playing region or the second posture playing region, the format adjuster preprocesses the resolution of the 3D signals, to adapt to the display resolution of the first posture playing region or the second posture playing region.

A method for implementing 3D image display in the above 3D display device is provided according to embodiments of the present disclosure. The method for implementing 3D image display comprises:

detecting a posture of the 3D display device, comprising, detecting a posture in which the 3D display device is, or detecting a posture change of the 3D display device, or detecting the both;

when detecting that the posture of the 3D display device changes, adjusting the display of a 3D image so that a display orientation of the 3D image is kept in an initial display orientation before the posture change of the 3D display device. Thus, the 3D image may always be adapted to the viewing orientation of the user.

Figure 7:
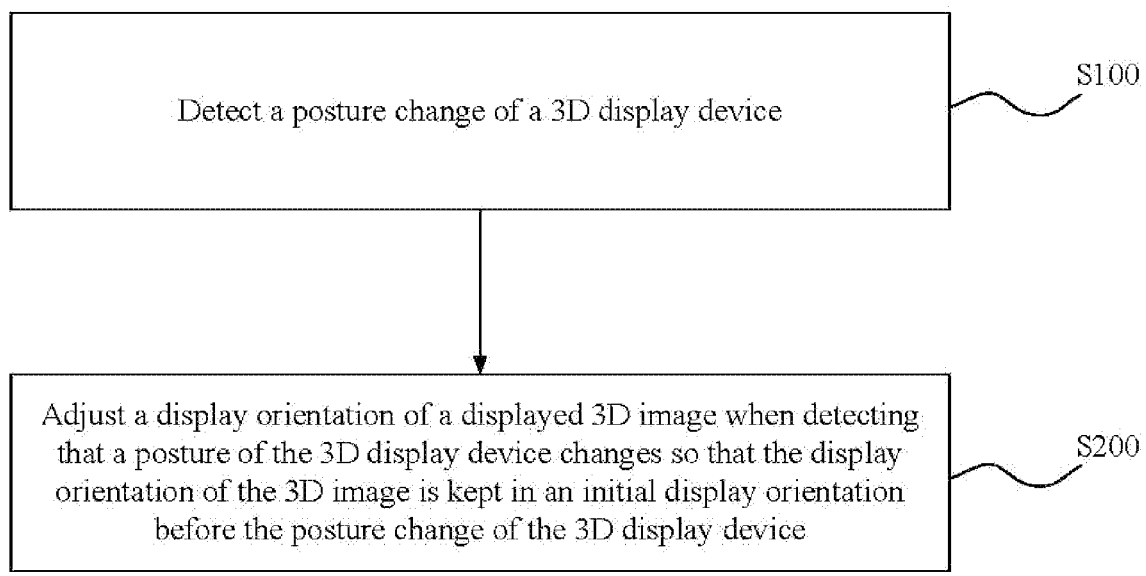
FIG. 7 is a flow chart of switching display of 3D images in a 3D display device according to an embodiment of the present disclosure.

In some embodiments, as shown in FIG. 7, the method for implementing 3D image display comprises:

S100, detecting a posture change of the 3D display device; and

S200, when detecting that the posture of the 3D display device changes, adjusting a display orientation of a displayed 3D image so that the display orientation of the 3D image is kept in an initial display orientation before the posture change of the 3D display device.

In some embodiments, detecting a posture in which the 3D display device is, or detecting a posture change of the 3D display device may be completed by the posture detection apparatus; and adjusting the display of a 3D image so that a display orientation of the 3D image is kept in an initial display orientation before the posture change of the 3D display device may be completed by the 3D processing apparatus.

In some embodiments, detecting a posture in which the 3D display device is, or detecting a posture change of the 3D display device comprises: detecting a rotational angular velocity of the 3D display device, and determining the posture in which the 3D display device is or the posture change of the 3D display device according to the rotational angular velocity.

In some embodiments, adjusting a display orientation of a 3D image comprises: rotating the display orientation of the 3D image in a plane in which the 3D image is located, so that the 3D image is kept in the initial display orientation before the posture change of the 3D display device.

In some embodiments, the posture of the 3D display device comprises at least one of: a transverse screen display posture, a vertical screen display posture, and an oblique screen display posture.

In some embodiments, the first posture of the 3D display device before the posture change comprises: any one of the transverse screen display posture, the vertical screen display posture, and the oblique screen display posture; and the second posture of the 3D display device after the posture change comprises any one of: the transverse screen display posture, the vertical screen display posture, and the oblique screen display posture, different from the first posture.

In some embodiments, adjusting a display orientation of a 3D image comprises: rotating the 3D image to keep the 3D image in the initial display orientation corresponding to the first posture. Thus, for the user, no matter how to adjust the posture of the 3D display device, the display orientations of the seen 3D images are consistent.

In some embodiments, when any one of the first posture and the second posture is the oblique screen display posture, adjusting a display orientation of a 3D image further comprises: displaying the 3D image in a full screen display mode.

In some embodiments, adjusting a display orientation of a 3D image comprises: rotating the display orientation of the 3D image in a plane in which the 3D image is located, so that the 3D image is kept within an initial display orientation range, wherein the initial display orientation range comprises the initial display orientation. Thus, the display orientation of the displayed 3D image may be fine-adjusted or adjusted according to motion of the user, to adapt to the motion of the user.

In some embodiments, the method for implementing 3D image display further comprises: adjusting the display orientation of the 3D image according to a viewing orientation of the user, so that the display orientation of the 3D image coincides with the viewing orientation of the user. The viewing orientation of the user may comprise any one of a transverse viewing orientation, a vertical viewing orientation, and an oblique viewing orientation.

In some embodiments, eye positioning may further be performed for the user; and the viewing orientation of the user is determined according to the obtained eye positioning data. The above, for example, may be implemented by an eye positioning apparatus.

In some embodiments, adjusting the display orientation of the 3D image comprises: rendering composite pixels in a multi-viewpoint 3D display screen of the 3D display device based on the adjusted display orientation (or the display orientation after the posture change of the 3D display device) of the 3D image. For example, in a posture, based on a correspondence between subpixels of each composite subpixel in the multi-view 3D display screen and viewpoints, the subpixels corresponding to the viewpoints determined by the eye positioning data are rendered according to a to-be-displayed 3D image. Alternatively, for example, in another posture, based on a correspondence between each composite pixel in the multi-viewpoint 3D display screen and each viewpoint, the subpixels in the composite pixel corresponding to the viewpoint determined by the eye positioning data are rendered according to the to-be-displayed 3D image.

The adjusting of the display orientation of the 3D image and the rendering of the subpixels may be completed by the 3D processing apparatus.

In some embodiments, the method for implementing 3D image display in the 3D display device comprises:

acquiring 3D signals;

in response to a signal that the 3D display device is in the first posture or switched to the first posture, playing 3D images from the 3D signals in the first posture playing region; and in response to a signal that the 3D display device is in the second posture or switched to the second posture, playing 3D images from the 3D signals in the second posture playing region.

In embodiments of the present disclosure, the "posture" of the 3D display device is equivalent to the "orientation" of the 3D display device.

In some embodiments, the switching method further comprises: acquiring real-time eye positioning data in relation to the posture of the 3D display device.

In some embodiments, acquiring real-time eye positioning data in relation to the posture of the 3D display device comprises: in response to the signal that the 3D display device is in the first posture, acquiring positions of first posture viewpoints at which the eyes of the user are.

In some embodiments, acquiring real-time eye positioning data in relation to the posture of the 3D display device comprises: in response to the signal that the 3D display device is in the second posture, acquiring positions of second posture viewpoints at which the eyes of the user are.

In some embodiments, playing 3D images from the 3D signals in the first posture playing region comprises: rendering relevant subpixels in homochromatic subpixels of each composite subpixel in the first posture playing region according to the 3D images from the 3D signals, based on the first posture viewpoints at which the eyes of the user are.

In some embodiments, playing 3D images from the 3D signals in the second posture playing region comprises: rendering relevant subpixels, corresponding to the second posture viewpoints, in the covered composite pixels in the second posture playing region according to the 3D images from the 3D signals, based on the second posture viewpoints at which the eyes of the user are.

Figure 8:
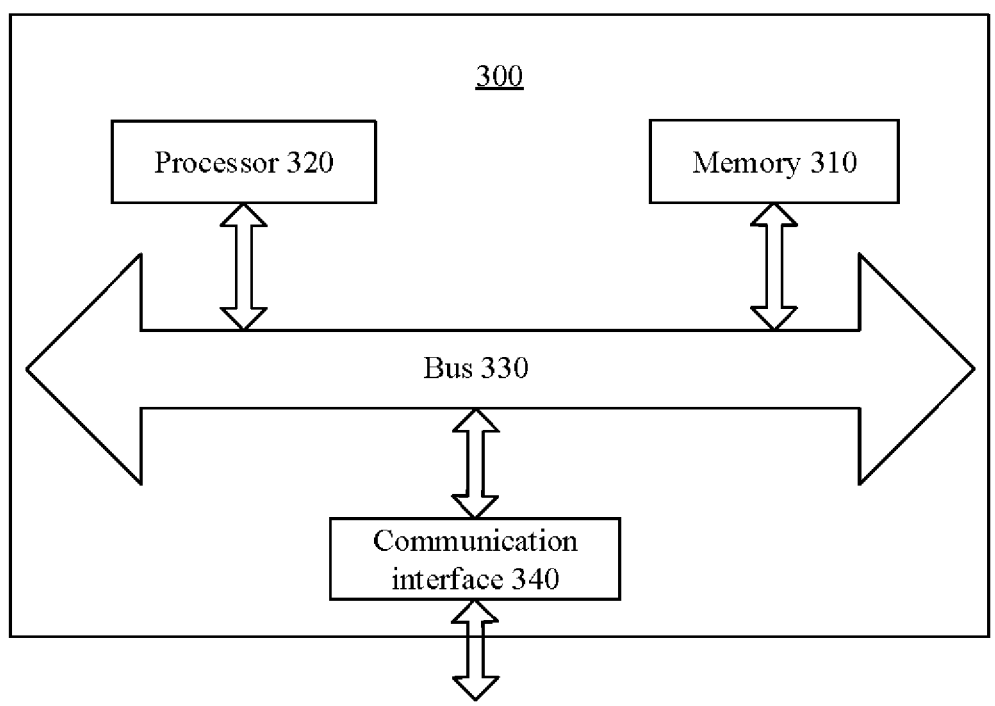
FIG. 8 is a structural schematic diagram of a 3D display device according to an embodiment of the present disclosure.

Embodiments of the present disclosure provide a 3D display device 300; and referring to FIG. 8, the 3D display device 300 comprises a processor 320 and a memory 310. The 3D display device 300 may further comprise a communication interface 340 and a bus 330. The processor 320, the communication interface 340, and the memory 310 communicate with each other through the bus 330. The communication interface 340 may be configured to transmit information. The processor 320 may call logic instructions in the memory 310, to implement the method for switching the display of 3D images in the 3D display device of the above embodiment. The logic instructions in the memory 310 may be implemented in the form of software functional apparatuses, and may be stored in a computer-readable storage medium when being sold or used as an independent product.

The computer-readable storage medium provided by the embodiments of the present disclosure stores the computer-executable instructions; and the computer-executable instructions are configured to implement the method for realizing 3D image display.

The computer program product provided by the embodiments of the present disclosure comprises a computer program stored on the computer-readable storage medium; the computer program comprises program instructions; and when the program instructions are executed by a computer, the computer is allowed to implement the above method for realizing 3D image display.

Technical solutions of embodiments of the present disclosure may be reflected in the form of a software product, which is stored in a storage medium and comprises one or more instructions for enabling computer equipment (which may be a personal computer, a server, network equipment or the like) to perform all or some steps of the method in embodiments of the present disclosure. The storage medium may be a non-transient storage medium, comprising a plurality of media capable of storing program codes, such as a U disk, a mobile hard disk, a read-only memory (ROM), a RAM, a diskette or an optical disk, and may also be a transient storage medium.

The above description and drawings sufficiently illustrate the embodiments of the present disclosure to enable those skilled in the art to practice them. Other embodiments may comprise structural, logical, electrical, process, and other changes. Unless expressly required, individual components and functions are optional and the order of operations may be changed. Parts and features of some embodiments may be included in or substituted for parts and features of other embodiments. The scope of the disclosed embodiments includes the full scope of the claims, and all available equivalents of the claims. The terms used in the present disclosure are used to describe the embodiments only and not to limit the claims. When used in the present disclosure, the terms "comprise", etc. refer to the presence of at least one of stated features, but does not preclude the presence of other features.

In the embodiments disclosed herein, the disclosed method and product (including, but not limited to the apparatus and the device) may be realized in other ways. For example, the device embodiments described above are merely schematic. For example, the division of the units may be only a logical functional division, and may be an additional division manner in actual realization. For example, multiple units or components may be combined or integrated into another system, or some features may be ignored or not executed. In addition, the displayed or discussed mutual coupling or direct coupling or communication connection may be indirect coupling or communication connection through some interfaces, devices or units, and may be electrical, mechanical or other forms. The units described as separate components may or may not be physically separated, and the components shown as the units may or may not be physical units. The present embodiments may be implemented by selecting some or all of the units according to actual needs. In addition, each functional unit in the embodiments of the present disclosure may be integrated into one processing unit, or each unit may exist physically alone, or two or more units may be integrated into one unit.

The flow charts and block diagrams in the drawings show architectures, functions and operations possibly implemented by systems, methods and computer program products according to the embodiments of the present disclosure. Each block in the flow charts or block diagrams may represent a part of a module, program segment or code, and part of the module, program segment or code contains one or more executable instructions for implementing specified logical functions. In some alternative implementations, the functions marked in the blocks may also occur in an order different from the order marked in the drawings. For example, two continuous blocks may actually be executed substantially concurrently, or sometimes may be executed in a reverse order, depending on the functions involved. In the descriptions corresponding to the flow charts and the block diagrams in the drawings, operations or steps corresponding to different blocks may also occur in different orders than those disclosed, and sometimes there is no specific order between different operations or steps. For example, two continuous operations or steps may be actually performed substantially concurrently, or sometimes may be performed in the reverse order, depending on the functions involved. Each block in the block diagrams and/or flow charts, and combinations of the blocks in the block diagrams and/or flow charts, can be implemented by special hardware-based systems that perform specified functions or actions, or implemented by combinations of special hardware and computer instructions.

What is claimed is:

1. A method for implementing 3D image display, comprising:

detecting a posture change of a 3D display device, wherein the 3D display device comprises a multi-viewpoint 3D display screen, the multi-viewpoint 3D display screen comprises a plurality of composite pixels and a lenticular grating covering the plurality of composite pixels, each composite pixel of the plurality of composite pixels comprises a plurality of composite subpixels, each composite subpixel of the plurality of composite subpixels comprises a plurality of subpixels, and the lenticular grating is obliquely arranged to cover a plurality of subpixels along a first direction of the 3D display device to define a plurality of first posture viewpoints and cover at least two composite pixels along a second direction of the 3D display device to define at least two second posture viewpoints; and adjusting a display orientation of a displayed 3D image when detecting that a posture of the 3D display device changes, so that the 3D image is kept in an initial display orientation before a posture change of the 3D display device.

2. The method according to claim 1, wherein
detecting a posture change of a 3D display device comprises: detecting a rotational angular velocity of the 3D display device, and determining a posture change of the 3D display device according to the rotational angular velocity;
adjusting a display orientation of a 3D image comprises:
rotating a display orientation of the 3D image in a plane in which the 3D image is located, so that the 3D image is kept in an initial display orientation before a posture change of the 3D display device;
or,
rotating a display orientation of the 3D image in a plane in which the 3D image is located, so that the 3D image is kept within an initial display orientation range; wherein the initial display orientation range comprises the initial display orientation.

3. The method according to claim 2, wherein a posture of the 3D display device comprises at least one of: a transverse screen display posture, a vertical screen display posture, and an oblique screen display posture;
wherein
a first posture of the 3D display device before a posture change comprises: any one of a transverse screen display posture, a vertical screen display posture, and an oblique screen display posture;
a second posture of the 3D display device after a posture change comprises: any one, different from the first posture, of a transverse screen display posture, a vertical screen display posture, and an oblique screen display posture;
adjusting a display orientation of the 3D image comprises:
rotating the 3D image so that the 3D image is kept in an initial display orientation corresponding to the first posture.

4. The method according to claim 3, wherein when any one of the first posture and the second posture is an oblique screen display posture, adjusting a display orientation of the 3D image further comprises:
displaying the 3D image in a full screen display mode.

5. The method according to claim 1, further comprising:
adjusting a display orientation of the 3D image according to a viewing orientation of a user, so that a display orientation of the 3D image coincides with a viewing orientation of the user.

6. The method according to claim 5, wherein
a viewing orientation of the user comprises: any one of a transverse viewing orientation, a vertical viewing orientation, and an oblique viewing orientation;
the method further comprises: performing eye positioning for the user, and determining a viewing orientation of the user according to obtained eye positioning data.

7. The method according to claim 1, wherein adjusting a display orientation of the 3D image comprises:
rendering subpixels in a multi-viewpoint 3D display screen of the 3D display device based on an adjusted display orientation of the 3D image.

8. The method according to claim 1, wherein a plurality of subpixels of each composite subpixel are arranged in row in the first direction of the 3D display device; and/or,
a plurality of composite subpixels of each composite pixel are arranged in parallel in the second direction of the 3D display device.

9. The method according to claim 8, wherein a tilt angle θ of the lenticular grating relative to the second direction of the 3D display device is arranged in such a way that a following condition is satisfied:

$$\pm 1/i \leq \tan\theta \leq \pm \tfrac{1}{2}.$$

10. The method according to claim 9, wherein a tilt angle θ of the lenticular grating relative to the second direction of the 3D display device is arranged in such a way that a following condition is satisfied:

$$\tan\theta = 1/j,\ \text{wherein } 2 \leq j \leq i,\ \text{and } j \text{ is an integer.}$$

11. A 3D display device, comprising:
a processor; and
a memory, storing program instructions;
wherein the processor is configured to execute the method of claim 1 when the program instructions are executed.

12. A 3D display device, comprising:
a multi-viewpoint 3D display screen, comprising a plurality of composite pixels and a lenticular grating covering the plurality of composite pixels, wherein each composite pixel of the plurality of composite pixels comprises a plurality of composite subpixels, each composite subpixel of the plurality of composite subpixels comprises a plurality of subpixels, and the lenticular grating is obliquely arranged to cover a plurality of subpixels along a first direction of the 3D display device to define a plurality of first posture viewpoints and cover at least two composite pixels along a second direction of the 3D display device to define at least two second posture viewpoints;
a posture detection apparatus, configured to detect a posture change of the 3D display device; and
a 3D processing apparatus, configured to adjust a display orientation of a displayed 3D image based on a detected posture change of the 3D display device, so that the 3D image is kept in an initial display orientation before a posture change of the 3D display device.

13. The 3D display device according to claim 12, wherein the posture detection apparatus is configured to detect a rotational angular velocity of the 3D display device, and determine a posture change of the 3D display device according to the rotational angular velocity;
the 3D processing apparatus is configured to rotate a display orientation of the 3D image in a plane in which the 3D image is located, so that the 3D image is kept in an initial display orientation before a posture change of the 3D display device; or the 3D processing apparatus is configured to rotate a display orientation of the 3D image in a plane in which the 3D image is located, so that the 3D image is kept within an initial display orientation range, wherein the initial display orientation range comprises the initial display orientation.

14. The 3D display device according to claim 13, wherein a posture of the 3D display device comprises at least one of:

a transverse screen display posture, a vertical screen display posture, and an oblique screen display posture;
wherein
a first posture of the 3D display device before a posture change comprises: any one of a transverse screen display posture, a vertical screen display posture, and an oblique screen display posture;
a second posture of the 3D display device after a posture change comprises: any one, different from the first posture, of a transverse screen display posture, a vertical screen display posture, and an oblique screen display posture;
the 3D processing apparatus is configured to rotate the 3D image so that the 3D image is kept in an initial display orientation corresponding to the first posture;
wherein the 3D processing apparatus is configured to display the 3D image in a full screen display mode when any one of the first posture and the second posture is an oblique screen display posture.

15. The 3D display device according to claim 14, wherein the 3D processing apparatus is configured to display the 3D image in a full screen display mode when any one of the first posture and the second posture is an oblique screen display posture.

16. The 3D display device according to claim 12, wherein the 3D processing apparatus is configured to adjust a display orientation of the 3D image according to a viewing orientation of a user, so that a display orientation of the 3D image coincides with a viewing orientation of the user;
or,
the 3D processing apparatus is configured to render composite pixels in a multi-viewpoint 3D display screen of the 3D display device based on an adjusted display orientation of the 3D image.

17. The 3D display device according to claim 16, wherein a viewing orientation of the user comprises: any one of a transverse viewing orientation, a vertical viewing orientation, and an oblique viewing orientation;
the 3D display device further comprises an eye positioning data acquisition apparatus configured to acquire eye positioning data;
the 3D processing apparatus is configured to determine a viewing orientation of the user according to obtained eye positioning data.

18. The 3D display device according to claim 12, wherein a plurality of subpixels of each composite subpixel are arranged in row in the first direction of the 3D display device; and/or, a plurality of composite subpixels of each composite pixel are arranged in parallel in the second direction of the 3D display device.

19. The 3D display device according to claim 18, wherein a tilt angle $\theta$ of the lenticular grating relative to the second direction of the 3D display device satisfies a following condition:

$\pm 1/i \leq \tan \theta \leq \pm \frac{1}{2}$.

20. The 3D display device according to claim 19, wherein a tilt angle $\theta$ of the lenticular grating relative to the second direction of the 3D display device satisfies a following condition:

$\tan \theta = 1/j$, wherein $2 \leq j \leq i$, and $j$ is an integer.

21. A non-transitory computer-readable storage medium, storing computer-executable instructions, wherein the computer-executable instructions are configured to execute the method of claim 1.

22. A computer program product, comprising computer programs stored on a non-transitory computer-readable storage medium, wherein the computer programs comprise program instructions, and make a computer execute the method of claim 1 when the program instructions are executed by the computer.

* * * * *